United States Patent [19]

Diffenderfer et al.

[11] Patent Number: 4,568,313
[45] Date of Patent: Feb. 4, 1986

[54] PROTECTIVE GUARD FOR ARTICULATED SHAFTING

[75] Inventors: Harold R. Diffenderfer; George S. Rowley, both of Pottstown, Pa.

[73] Assignee: Neapco, Inc., Pottstown, Pa.

[21] Appl. No.: 497,405

[22] Filed: May 23, 1983

[51] Int. Cl.⁴ .............................. F16C 1/26; F16P 1/00
[52] U.S. Cl. ....................................... 464/172; 74/609
[58] Field of Search ..... 464/172, 175, 178, DIG. 901, 464/182; 74/18, 18.2, 609

[56] References Cited

U.S. PATENT DOCUMENTS

| | | | |
|---|---|---|---|
| 2,772,550 | 12/1956 | Harrington | 464/172 X |
| 3,344,618 | 10/1967 | Young | 64/3 |
| 3,618,340 | 11/1971 | Geisthoff et al. | 464/172 X |
| 3,703,089 | 11/1972 | Geisthoff et al. | 464/901 X |
| 4,338,797 | 7/1982 | Herchenbach | 464/172 X |

FOREIGN PATENT DOCUMENTS 1188869  3/1965  Fed. Rep. of Germany ........ 74/609

Primary Examiner—Stuart S. Levy
Assistant Examiner—Lynn M. Sohacki
Attorney, Agent, or Firm—Woodcock Washburn Kurtz Mackiewicz & Norris

[57] ABSTRACT

An improved guard for an articulated torque transmitting shaft such as the power transmission shaft connecting a tractor with an agricultural implement is disclosed. The guard according to the invention comprises bellows members for fitting over U-joints at either end and telescoping tubes connecting the bellows. The telescoping tubes are locked to the respective bellows by L-shaped keys which extend through slots formed through the tube and through the bellows and which have circumferentially extending tabs which ride in grooves formed in the universal joints, to locate the juncture of the tube and bellows with respect to the joint. In the preferred embodiment, the entire assembly is constructed of plastic.

4 Claims, 5 Drawing Figures

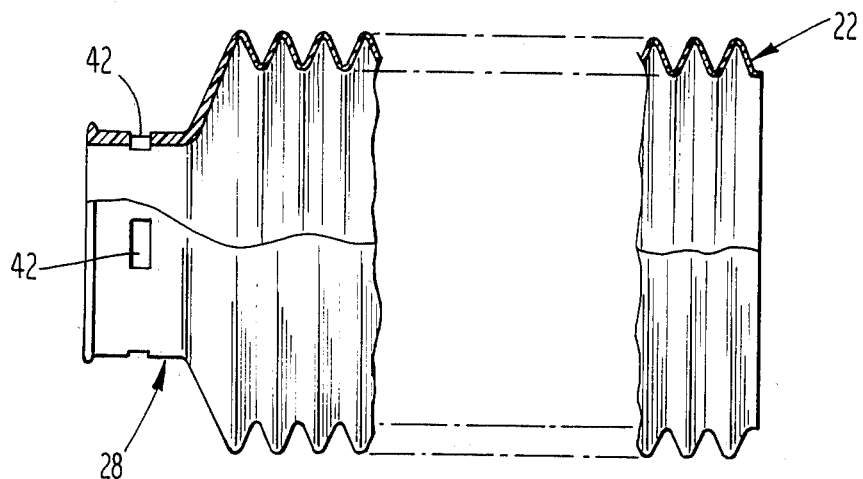
Fig. 3
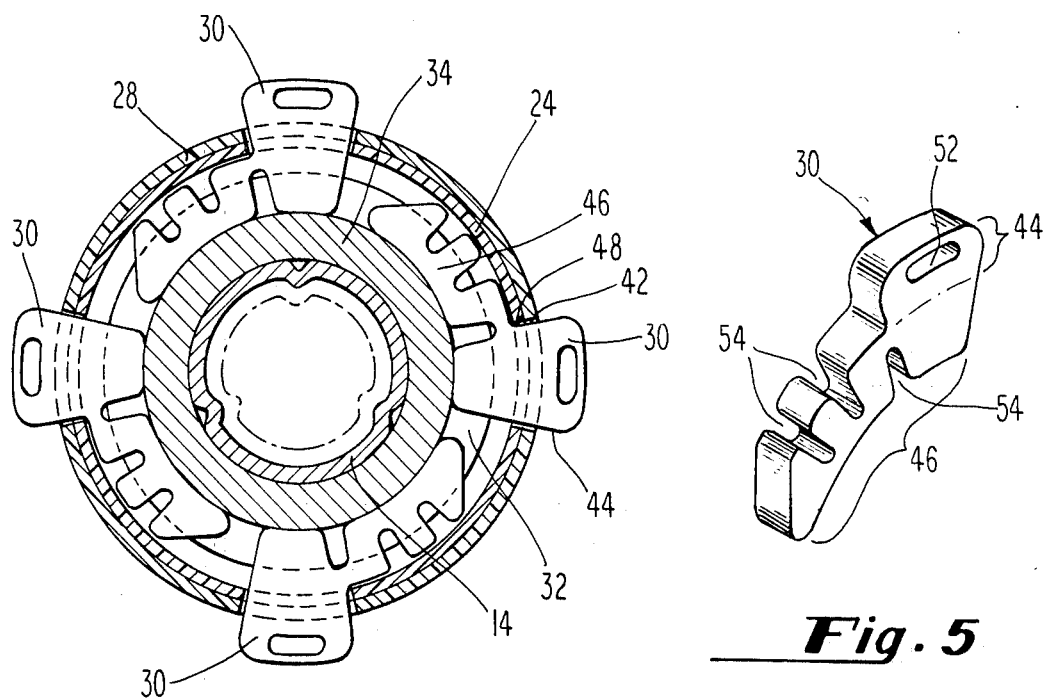
Fig. 4
Fig. 5

PROTECTIVE GUARD FOR ARTICULATED SHAFTING

FIELD OF THE INVENTION

This invention relates to a protective guard structure for articulated, telescoping, torque transmitting shafting such as the power take-off shafts used to transmit power from tractors to agricultural equipment.

BACKGROUND OF THE INVENTION

It is common practice in the agricultural industry to employ a tractor towing behind it an implement which receives its operating power from the tractor by means of a drive shaft connected to the power take-off (PTO) of the tractor. In order that the tractor and the towed implement can make reasonably sharp turns, it is necessary that this drive shaft be articulated, i.e., provided with U-joints or the like so that the relative angular orientations of the power take-off shaft on the tractor and the power receiving shaft on the implement can vary while the shaft continues to spin, transmitting power to the implement. It is ordinarily not possible to arrange the axes of the U-joints to coincide with the pivoting axis of the tow bar of the tractor and the draw bar of the implement so that it is necessary that the articulated shaft also telescope to permit turning.

The art has recognized for some time that it would be desirable to provide a protective outer shield for such telescoping articulated shafts because of the grave danger posed to operators and the like, who might, for example, be caught up in the machinery. However, none of the prior art approaches known fully satisfy the needs of the art which are for an inexpensive, readily manufacturable, easy to install, protective structure which would be durable in service, adaptable to a wide variety of tractors and implements, which would be attachable or removable without complex tools or difficult procedures and yet would provide total coverage of the revolving drive shaft elements.

It would clearly be desirable that such a protective guard be formed of a lightweight and inexpensive material and that of choice is clearly plastic. Metallic shield members would be unduly heavy and subject to corrosion; moreover, numerous impacts which would dent metal, but not a plastic material, can be expected to occur in the agricultural environment. The prior art shows various approaches to the use of plastics for construction of protective guards for articulated power transmission shafts, but all approaches of which the applicant is aware involve undue complexity in the manufacture of the various parts of the apparatus and substantial complexity in assembly of the device in the field. This last feature, undue complexity of assembly, is extremely important because complicated guard systems are often discarded rather than being installed and maintained properly. It must be simple enough that it can be installed by the user himself in a minimum period of time and with simple tools. Otherwise, it will not be used. In this connection it should be noted as well that typically the articulated torque transmitting shafts are permanently affixed to the implements, not the tractor. Accordingly, a farmer who hooks various implements to his tractor will want a protective guard on each of the implements. This further reinforces the requirement that the device be easy to install, as well as, of course, inexpensive to purchase.

One pertinent prior art approach to applicant's present invention is shown in U.S. Pat. No. 3,344,618 to Young. This patent shows a bell-shaped shield member extending over a yoke of a universal joint at one end of a power transmission shaft. The bell is attached to one of a pair of telescoped tubes by tabs formed in the bell. The other tube is supported by a rather complex molded plastic device which also comprises a plurality of tabs to interact with slots formed in the telescoping tubing, thus holding the assembly together. The Young tab member is annular and is slit through so that it can be sprung outwardly enough to be stretched over the shaft, thus not necessitating disassembly of the drive shaft for assembly of the device. However, it is a rather complex molding, in all dimensions, as it extends all the way around the torque transmitting shaft and has significant linear extent along it as well. This device is rather complex and expensive to manufacture. Moreover, its design requires simultaneous compression of a number of tabs before the assembly can be taken apart, which leads to undue difficulty of disassembly.

Harrington U.S. Pat. No. 2,772,550 is also relevant. This patent shows use of a pair of resilient arcuate members having an elongate portion which rides in a groove formed in a U-joint knuckle and another tab member which mates with a slot in a bell member. Telescoping tubes are stated to be similarly located, col. 2, lines 61-72, but this description is unclear and does not appear to comport with the drawings. In any event, the Harrington arrangement would require paired grooves and pairs of the arcuate members if tubes were to be similarly assembled. Moreover, the Harrington arrangement does not provide a means for attachment of the separate joint cover member directly to the shield tubing, or of a chain or the like to anchor the shield assembly against rotation, both of which possibilities are also desirable.

Other prior art expedients which are known to the applicants as being on the market involve such expedients as drilling and riveting, or adhesive connection, of relatively large diameter bell members, which guard the yokes of the universal joints, to the tubes which cover the telescoping portions of the articulated shaft. Such expedients are highly undesirable because ready disassembly of the protective guard is an important criterion of its design.

Accordingly, a need exists in the art for an improved protective guard for articulated shafting.

OBJECTS OF THE INVENTION

It is therefore an object of the invention to provide an improved guard for articulated telescoping power transmitting shafts; one having the qualities of durability in service, simplicity of design and assembly, adaptability to a wide variety of tractor and implement combinations, light in weight, providing total coverage of the power shaft, and capable of being serviced readily, using simple tools and without requirement of special skills; and further providing means for anchoring the assembly against rotation.

SUMMARY OF THE INVENTION

The present invention satisfies the above-discussed needs of the art and objects of the invention by providing a protective guard for an articulated torque transmitting shaft which comprises bellows sized to fit over the yokes of U-joints on either end connected to telescoping plastic tubing members by means of a plurality of unitary keys. The keys are sized to fit through mating slots in the plastic tubes and bellows so as to affix one to the other, and also extend arcuately to fit into an annular groove formed in the yoke so as to locate the junction of the tube and the bellows with respect to the yoke. The keys are manufactured out of a tough yielding plastic material and are formed such that they can be inserted by hand and can be removed from the groove and the slots by a simple tool such as a screwdriver, yet have sufficient rigidity that once inserted they remain in place, thus holding the assembly together. The plastic tubes are simply cut off from stock lengths of tubing and the slots are pierced therein, while the bellows are molded to a size such that a bellows of a given diameter with the appropriate plastic tube can be used in a wide variety of applications. The keys also provide a means of ready attachment of an anchoring chain or the like.

BRIEF DESCRIPTION OF THE DRAWINGS

The invention will be better understood if reference is made to the accompanying drawings, in which:

FIG. 3 is a more detailed view of the construction of the bellows which covers the U-joints of the drive shaft of FIG. 2;

FIG. 4 is a cross-sectional view showing the way in which the key members hold the bellows to the tubes and how their juncture is located with respect to the yoke, taken along the line 4—4 FIG. 2; and FIG. 5 is a perspective view of one of the keys.

DESCRIPTION OF THE PREFERRED EMBODIMENTS

Figure 1:
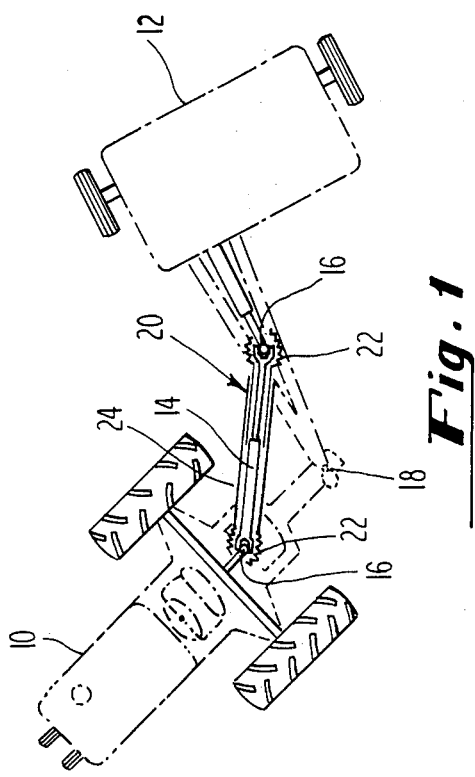
FIG. 1 represents an overhead view of a tractor towing an implement and powering it by means of a torque transmitting shaft, illustrating the need for articulation in assemblies of this kind.

FIG. 1 shows a tractor 10 towing a powered implement 12. Power is transmitted from the tractor power take-off shaft by means of an articulated shaft 14. Because the axes of the U-joints 16 at which the articulated shaft pivots are not coincident with the axis 18 at which the tow bar of the tractor joins the draw bar of the implement 12, the relative distance between the two U-joints 16 changes as the tractor and implement go around a turn, or over an undulation in the ground, so that the shaft must telescope. Also shown in FIG. 1 is the cover 20 of the shaft 14. As shown, it comprises bellows 22 at either end and telescoping tubing 24 between them, which covers the drive shaft 14. As shown, bellows 22 is displaced when contacted by a U-joint to conform to the angular movements of the shaft 14.

Figure 2:
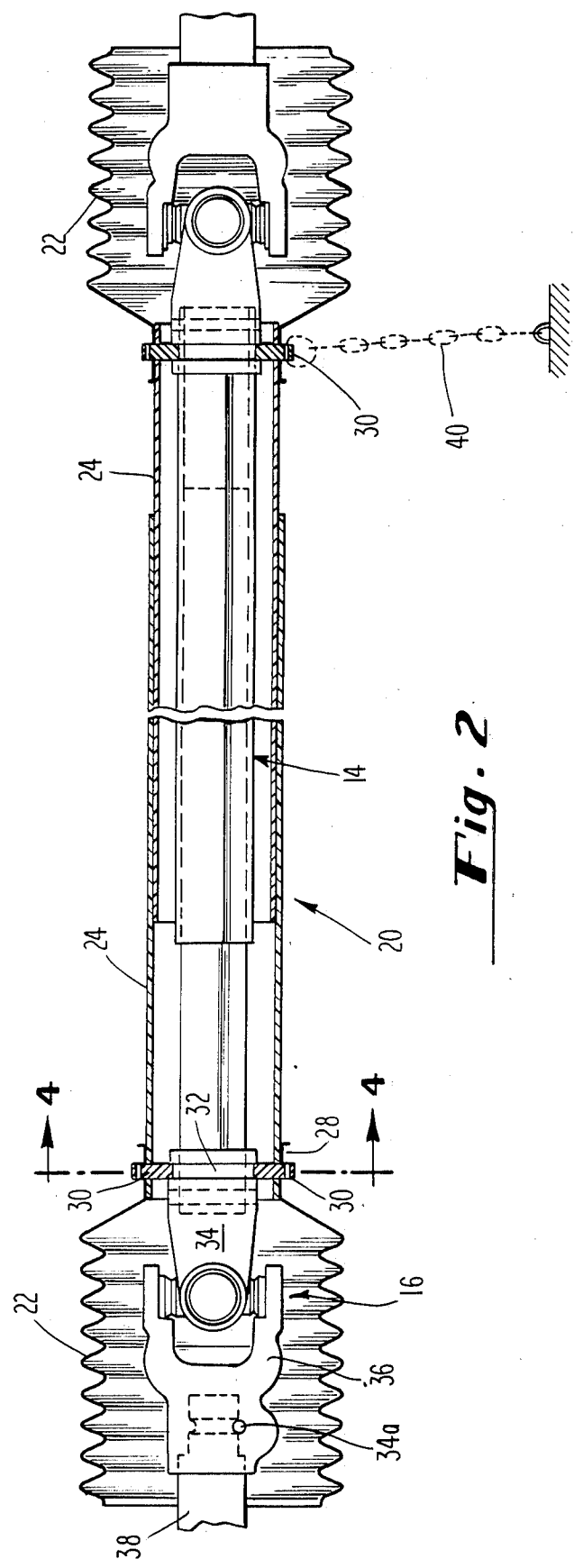
FIG. 2 is an overall view of the drive shaft and guard assembly.

FIG. 2 shows the assembly of the bellows 22 and the telescoping shafts 24 in greater detail. As shown, the bellows 22 are provided with flanges 28 which surround the tubes 24. The tubes 24 are held to the flanges 28 by key members 30 which are inserted through slots going through both the tubes 24 and the flange 28, thus affixing them to one another. The keys also ride in a groove 32 formed in the yoke 34 of the U-joint assembly 16, so that the junction of the bellows 24 and the tube 24 is fixed. The force exerted on the keys 30 by the groove 32 causes the tubes 24 to telescope as required during operation.

As also shown in FIG. 2 one end of the drive shaft is provided with a quick detach pin 34a, whereby a user may depress the pin 34a releasing the yoke 36 from the splined power take-off shaft 38 of the tractor in conventional fashion. Of importance in this connection is the fact that the bellows 22 must be made sufficiently flexible so that the user can readily pull it back with one hand and depress the pin 34a with the other, if the protective guard is not to impede this function unduly. As discussed above, typically the various implements possessed by the user will each have their own telescoping shafts 14 and hence would have protective guards according to the invention assembled over each of these. When it is desired that a specific implement be used, the user attaches the U-joint 36 to the PTO shaft 38 by displacing the bellows 22, depressing the quick disconnect pin 34a sliding the U-joint onto the PTO shaft 38. The protective guard, being already installed, is now in the normal operating position.

As shown in phantom on the right side of the drawing of FIG. 2, a chain or other similar device 40 may be attached to one of the keys 30 to prevent the guard assembly from rotating with the power take-off shaft. If the chain is not used the guard will ordinarily rotate with the shaft. However, because the only contact between the guard and the shaft is made by the key members 30 and is frictional, not rigid, if an operator contacts a spinning guard, it will stop rotating, thus precluding injury to the operator. In a preferred embodiment the keys 30 are manufactured of a plastic sold under the trademark ZYTEL (DuPont trademark), a polyamide derivative which has a very low coefficient of friction. Use of this material allows the keys to contact the yokes of the universal joint continually without premature wearing-out of the keys, even when the chain 40 is used to anchor the assembly against rotation.

FIG. 3 shows an enlarged detailed view of one of the bellows 22. This is a one-piece construction which may desirably be manufactured by the well understood process referred to as "blow-molding" and in a preferred embodiment is a polyethylene material. The bellows may be manufactured in a variety of diameters to accommodate various universal joints and typically have four slots punched in the flange 28 formed at their end for interaction with the keys 30 discussed above in connection with FIG. 2. The thickness of the walls and material mixtures are controlled to limit flex; in a presently preferred embodiment, the conical portion connecting the flange 28 with the ribbed section is made relatively thick, so that the ribbed portion flexes preferentially. Typically the bellows are made long enough for complete universal joint protection. They can be reduced in length conveniently by cutting to accommodate the application of the implement manufacturer or by the user, in replacement applications.

FIG. 4 is a cross-section taken along the line 4—4 of FIG. 2, showing how the keys 30 hold the assembly together. The key has a protruding portion 44 which extends outwardly through a slot 42 in the flange portion 28 of the bellows member 22 and through a mating slot 48 formed in the protective tube 24, which may be of a rigid polyethylene tubing, simply having the slots 48 punched therein and cut to length. An extended arcuate portion 46 of the key 30 also fits within a groove 32 turned in the material of the yoke 34 as shown in FIG. 2. In this way, the juncture of the tube 24 and the bellows 22 is located with respect to the U-joint and the tubes 24 are caused to telescope by relative motion of the tractor 10 and the attached implement 12 in normal operation. Within the yoke 34 is located a drive shaft tube 14. The particular shape shown is in accordance with applicants' co-pending application Ser. No. 505,770 filed June 20, 1983, but the present invention is, of course, not to be so limited. Within that drive shaft tube 14 is shown the other drive shaft tube, in phantom. These two drive shaft tubes slide with respect to one another when the assembly telescopes. The mating grooves shown formed therein are the torque transmitting members.

FIG. 5 shows a detailed perspective view of the key 30. It has, as noted, an upstanding vertical portion 44 for interaction with the slots 42 and 48 formed in the bellows flange 28 and the tube 24 respectively. This portion 44 has a slot 52 formed therein for insertion of a screwdriver or similar tool for removal of the tab 30 from the assembly, and for attachment of the chain 40. The arcuately extending portion 46 has several recesses 54 formed in it to control its flexibility, so that it can be deformed to fit through the slots upon assembly or disassembly. The grooves 54 also provide reservoirs for lubricant. Note that the key 30 can readily be removed for lubrication as desired. Several materials in the polyamides family including a polyamide sold under the trademark ZYTEL have been successfully tested for this application. Experimentation shows that these materials formed as shown in FIG. 5 provide a key which is flexible enough to be withdrawn through the slots by simple application of a screwdriver and hand pressure, yet rigid enough to retain the bellows tube with respect to the yoke when assembled. It has a sufficiently low coefficient of friction that holding the assembly still (as by the chain 40 shown in FIG. 2) does not cause the keys 30 to wear out prematurely, nor cause them to drag on the rotation of the power take-off assembly. The key additionally provides a bearing function, supporting the guard assembly while permitting relative rotation of guard and yoke.

Those skilled in the art will recognize that there has been described a protective guard for an articulated torque transmitting member which satisfies the needs of the art and objects of the invention mentioned above in that it is simple to manufacture and assemble, light in weight, durable in service and provides a substantial measure of protection, while not impeding the functions of the articulated shaft nor interfering with ready disconnection of a powered implement from a tractor. It will also be appreciated that while a preferred embodiment of the invention has been shown and described, this is merely exemplary and that the invention is to be measured by the following claims.

I claim:

1. A protective guard assembly for shielding a telescoping torque transmitting member having articulated joints on its ends, the joints comprising yokes having circumferential grooves formed therein, said guard assembly comprising:

first and second telescoping tubes for shielding the telescoping torque transmitting member;

first and second cover members for shielding the articulated joints; and flexible keys for joining each of said telescoping tubes within one end of a corresponding one of said cover members, each said key comprising:

a tab portion extending radially outwardly from the interior of one of said tubes and of the corresponding one of said cover members through mating holes formed in said tube and said cover member, and an arcuate elongate portion extending circumferentially around the inner wall of said tube and extending radially inwardly into the circumferential groove in the yoke, said arcuate elongate portion being shaped to provide a bearing function for supporting the guard assembly while permitting relative rotation of the guard assembly and yoke, said arcuate elongate portion having radially extending recess means formed therein to control its flexiblity so that is can be deformed to fit through said mating holes upon assembly or disassembly of the guard assembly and said recess means providing reservoir means for lubricant when said arcuate elongate portion is positioned within the circumferential groove in the yoke.

2. The assembly of claim 1 wherein each said key is of plastic.

3. The assembly of claim 1 in which a hole extends through the tab portion of said key.

4. A guard assembly for a telescoping torque transmitting shaft comprising first and second telescoping torque transmitting shafts connected at either end to the yokes of U-joints, each of said yokes having a groove formed therearound, comprising:

first and second telescoping plastic tubes assembled over said shafts;

first and second flexible plastic bellows members each having a cylindrical end assembled over the non-telescope ends of said tubes, said cylindrical ends of said bellows members and said non-telescoped ends of said tubes having a plurality of mating holes for receiving keys; and a plurality of flexible plastic keys corresponding to the number of mating holes, each of said bellows being connected to the corresponding one of said tubes solely by said keys, each said key comprising a tab member extending outwardly through said mating holes from within one of said tubes and the corresponding one of said bellows members, and comprising an arcuate bearing member for resting in the groove formed in one of said yokes, whereby the joint of said tube and said bellows member is retained in the vicinity of said yoke, said arcuate bearing member having radially extending recess means therein adjacent said tab to control the flexibility of said key so that it can be deformed to fit through said mating holes upon assembly or disassembly of said guard assembly and said recess means providing reservoir means for lubricant when said arcuate bearing member is assembled in said yoke.

* * * * *